United States Patent
Nagasato et al.

(10) Patent No.: US 10,030,766 B2
(45) Date of Patent: Jul. 24, 2018

(54) HYDRAULIC CONTROL CIRCUIT OF TRANSMISSION

(71) Applicant: TOYOTA JIDOSHA KABUSHIKI KAISHA, Toyota-shi (JP)

(72) Inventors: Yu Nagasato, Susono (JP); Kenta Kimura, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 92 days.

(21) Appl. No.: 15/333,923

(22) Filed: Oct. 25, 2016

(65) Prior Publication Data

US 2017/0130828 A1    May 11, 2017

(30) Foreign Application Priority Data

Nov. 5, 2015    (JP) .................................. 2015-217847

(51) Int. Cl.
    *F16H 61/14*    (2006.01)
    *F16H 45/02*    (2006.01)

(52) U.S. Cl.
    CPC ........... *F16H 61/143* (2013.01); *F16H 45/02* (2013.01); *F16H 2045/0215* (2013.01)

(58) Field of Classification Search
    None
    See application file for complete search history.

(56) References Cited

U.S. PATENT DOCUMENTS 5,194,052 A    3/1993    Ueda et al.

FOREIGN PATENT DOCUMENTS

JP    61-25945    6/1986
JP    5-1756    1/1993

*Primary Examiner* — Jacob S. Scott
(74) *Attorney, Agent, or Firm* — Oblon, McClelland, Maier & Neustadt, L.L.P.

(57) ABSTRACT

A hydraulic control circuit of a transmission includes a first oil passage, supplying hydraulic oil from an oil pump to a torque converter, and a second oil passage branching off from the first oil passage and having an oil pressure lower than that in the first oil passage; a selection valve switching between the hydraulic oil in the first and the second oil passages to the torque converter; an oil-pressure adjustment valve provided on the first oil passage and adjusting an oil pressure of the hydraulic oil of the first oil passage; and a switching valve provided on the first oil passage and switching between interruption and supply of hydraulic oil to the selection valve. Further, the switching valve is provided on a downstream side of the branching position of the second oil passage in the first oil passage and on an upstream side of the oil-pressure adjustment valve.

4 Claims, 15 Drawing Sheets

HYDRAULIC CONTROL CIRCUIT OF TRANSMISSION

CROSS-REFERENCE TO RELATED APPLICATION(S)

The present application claims priority to and incorporates by reference the entire contents of Japanese Patent Application No. 2015-217847 filed in Japan on Nov. 5, 2015.

BACKGROUND OF THE INVENTION

1. Field of the Invention

The present disclosure relates to a hydraulic control circuit of a transmission, which supplies hydraulic oil to a torque converter of the transmission.

2. Description of the Related Art

An oil pump system including a high-pressure oil passage to which hydraulic oil is supplied from an oil pump at a high pressure, and a low-pressure oil passage to which the hydraulic oil is supplied at a low pressure is commonly known. In this oil pump system, the hydraulic oil is adjusted to a low pressure by a regulator valve when flowed in the low-pressure oil passage, and the oil pressure of the hydraulic oil is adjusted by an oil-pressure adjustment valve when the hydraulic oil is supplied through the high-pressure oil passage into a torque converter having a lock-up mechanism (see Japanese Patent Application Laid-open No. 5-001756).

In a configuration in which hydraulic oil is supplied through a high-pressure oil passage into a torque converter, there is a case where the torque converter does not need to be cooled. In this case, a method of placing a switching valve on the high-pressure oil passage and interrupting supply of the hydraulic oil to the torque converter with the switching valve can be applied. For example, Japanese Patent Application Publication No. 61-25945 describes a configuration of an oil pump system that supplies hydraulic oil to a torque converter, in which a switching valve is placed on an oil passage through which the hydraulic oil is supplied from an oil pump to the torque converter, thereby to reduce drive loss of the oil pump.

However, if the configuration in which the switching valve is placed on the high-pressure oil passage to interrupt supply of the hydraulic oil to the torque converter is added, the following problems occur. That is, if the hydraulic oil is interrupted by the switching valve, loss caused by leak of the hydraulic oil from an oil-pressure adjustment valve placed on the high-pressure oil passage or a selection valve that selectively switches between hydraulic oil in the low-pressure oil passage and hydraulic oil in the high-pressure oil passage, to be supplied to the torque converter may be increased. Furthermore, when the supply of the hydraulic oil to the torque converter is interrupted, supply of the hydraulic oil through the low-pressure oil passage may be also interrupted, which prevents the hydraulic oil from being supplied to constituent members requiring the supply of the hydraulic oil.

SUMMARY OF THE INVENTION

According to an aspect of the present disclosure, a hydraulic control circuit of a transmission is provided, the hydraulic control circuit including a first oil passage and a second oil passage formed therein, the first oil passage being a passage through which hydraulic oil is supplied from an oil pump to a torque converter having a lock-up mechanism, and the second oil passage branching off from the first oil passage and having an oil pressure set to be lower than an oil pressure of hydraulic oil in the first oil passage; a selection valve selectively switching between the hydraulic oil in the first oil passage and hydraulic oil in the second oil passage to be supplied to the torque converter; an oil-pressure adjustment valve provided on the first oil passage and adjusting an oil pressure of the hydraulic oil flowing through the first oil passage; and a switching valve provided on the first oil passage and switching between interruption and supply of hydraulic oil to the selection valve in accordance with a lock-up on state or a flex-controlled state in the lock-up mechanism. Further, the switching valve is provided on a downstream side of a branch position of the second oil passage from the first oil passage in a flowing direction of the hydraulic oil in the first oil passage and on an upstream side of the oil-pressure adjustment valve. The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Embodiments of the present disclosure will be explained below with reference to the accompanying drawings. In the all drawing described in the following embodiments, identical or corresponding parts are denoted with like reference signs. The present disclosure is not limited to the embodiments described below.

First Embodiment

Figure 1:
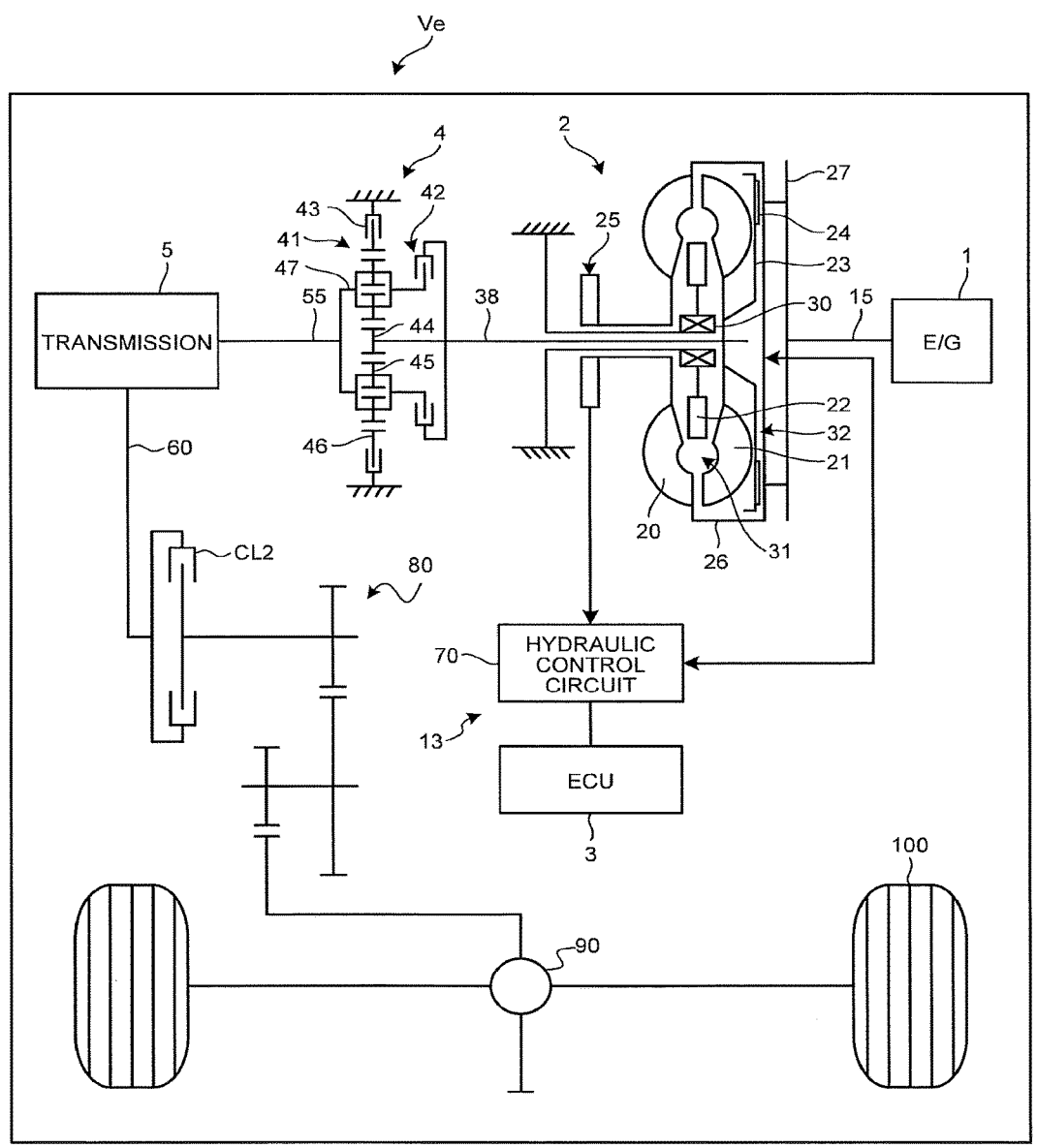
FIG. 1 is a diagram illustrating a vehicle in which a hydraulic control circuit is applied according to a first embodiment of the present disclosure.

A vehicle including a hydraulic control circuit of a transmission according to a first embodiment of the present disclosure is described first. FIG. 1 illustrates a configuration of a vehicle Ve according to the first embodiment.

As illustrated in FIG. 1, the vehicle Ve includes an engine 1 as a power source, a torque converter 2, an electronic control unit (hereinafter, ECU) 3, a clutch mechanism 4, and a transmission 5. The torque converter 2, the clutch mechanism 4, and the transmission 5 constitute a part of a power transmission path. The engine 1 outputs power from a crankshaft 15. The torque converter 2 is coupled (connected) to the engine 1. The clutch mechanism 4 constitutes a forward/backward-movement switching mechanism and is coupled to the torque converter 2. The transmission 5 is coupled to the clutch mechanism 4. The vehicle Ve further includes a hydraulic control device 13 that can supply a hydraulic oil to the power transmission path.

The torque converter 2 is one type of a fluid clutch and transmits power output from the engine 1 to the clutch mechanism 4 via the hydraulic oil. The torque converter 2 has a lock-up mechanism, and increases or keeps output torque from the engine 1 to be transmitted to the clutch mechanism 4.

The ECU 3 is mainly formed of a microcomputer including a Central Processing Unit (CPU), a Read Only Memory (ROM), a Random Access Memory (RAM) and the like. The ECU 3 performs calculation by using input data, and data and a program which are stored in advance in the ROM and the RAM, and outputs the calculation result as an instruction signal.

For example, the ECU 3 controls the engine 1, the torque converter 2, the clutch mechanism 4, and the transmission 5, which are a part of the power transmission path of the vehicle Ve. Specifically, the ECU 3 controls an operation of the engine 1 based on various input signals that are input from sensors attached at various positions of the vehicle Ve and various types of maps stored in the ROM. Further, the ECU 3 controls a gear ratio of the transmission 5, controls switching between the forward and backward movements of the clutch mechanism 4, and controls lock-up of the torque converter 2. The ECU 3 is connected to a hydraulic control circuit 70 and executes oil pressure control or the like on the hydraulic control circuit 70 to control, for example, the torque converter 2, the clutch mechanism 4, and the transmission 5.

The clutch mechanism 4 converts rotations transmitted from the crankshaft 15 of the engine 1 into those in a rotation direction for driving the vehicle Ve forward or into those in a rotation direction for driving the vehicle Ve backward. The clutch mechanism 4 can release the power transmitted from the engine 1 to the transmission 5.

The transmission 5 includes, for example, a non-stage belt transmission and has a primary shaft 55 serving as an input shaft and a secondary shaft 60 serving as an output shaft. The transmission 5 changes a rotation speed of the primary shaft 55 that is rotated by a power input from the clutch mechanism 4 into a desired rotation speed of the secondary shaft 60 according to an operation state of the vehicle Ve and outputs the desired rotation speed.

The secondary shaft 60 is connected to a speed reducer 80 via a clutch CL2 and is further coupled to a differential device 90 via the speed reducer 80. In this way, the power of the engine 1 is transmitted to driving wheels 100 of the vehicle Ve.

The torque converter 2 includes a pump impeller 20, a turbine runner 21, a stator 22, a lock-up clutch 23, and a facing 24, which is placed in the lock-up clutch 23. An oil pump 25 that is actuated by the power of the engine 1 is provided in the torque converter 2.

The pump impeller 20 is coupled to a front cover 26. The front cover 26 is coupled to the crankshaft 15 via a drive plate 27 of the engine 1. The power of the engine 1 is transmitted to the pump impeller 20 via the crankshaft 15 and the front cover 26, and the transmitted power is further transmitted to the turbine runner 21 using the hydraulic oil. The oil pump 25 is coupled to the pump impeller 20. The oil pump 25 is actuated upon transmission of the power from the engine 1 via the crankshaft 15, the front cover 26, and the pump impeller 20.

The turbine runner 21 is coupled to an input shaft 38 of the clutch mechanism 4. The turbine runner 21 transmits power of the crankshaft 15, which has been transmitted from the pump impeller 20 using the hydraulic oil, to the input shaft 38 of the clutch mechanism 4 provided on the output side. The stator 22 is placed between the pump impeller 20 and the turbine runner 21 and is fixed to a housing (not illustrated) via a one-way clutch 30.

The lock-up clutch 23 is placed between the turbine runner 21 and the front cover 26 and is coupled to the input shaft 38. The lock-up clutch 23 partitions a hydraulic chamber defined by the pump impeller 20 and the front cover 26 into an apply chamber 31 formed on a side of the lock-up clutch 23 where the pump impeller 20 is provided (located) and a release chamber 32 formed on a side of the lock-up clutch 23 where the drive plate 27 is provided. The facing 24 is placed on a side of the lock-up clutch 23 where the drive plate 27 is provided and is capable of being brought into contact with an inner part of the front cover 26. The hydraulic oil is supplied to the apply chamber 31 and the release chamber 32 from the hydraulic control circuit 70.

The lock-up clutch 23 performs a lock-up fastening operation by bringing the facing 24 into contact with the front cover 26 in response to a supply of the hydraulic oil from the hydraulic control circuit 70. When the lock-up clutch 23 performs the lock-up fastening operation, the facing 24 engages with the front cover 26, and the pump impeller 20 and the turbine runner 21 are fastened to each other. In the present specification, this state is referred to as "a lock-up on state". In the lock-up on state, the power of the crankshaft 15 can be transmitted directly to the turbine runner 21.

On the other hand, the lock-up clutch 23 performs a lock-up unfastening operation by separating the facing 24 from the front cover 26. When the lock-up clutch 23 performs the lock-up unfastening operation, the pump impeller 20 and the turbine runner 21 are unfastened (separated) from each other. In the present specification, this state is referred to as "a lock-up off state". In the lock-up off state, the power of the crankshaft 15 is transmitted to the turbine runner 21 via the hydraulic oil.

Meanwhile, a control to cause the facing 24 and the front cover 26 to slip over each other is executed on the lock-up clutch 23. In the present specification, this control is referred to as "a flex control" and a state in which the lock-up clutch 23 is flex-controlled is referred to as "a flex-controlled state".

The clutch mechanism 4 includes a planetary gear mechanism 41, a forward clutch 42, and a reverse brake 43. The planetary gear mechanism 41 includes a sun gear 44, a plurality of pinions 45, and a ring gear 46. The ring gear 46 meshes with the pinions 45 held by a switching carrier 47 and is connected to the reverse brake 43.

The hydraulic control device 13 includes the oil pump 25, and the hydraulic control circuit 70 to which the hydraulic oil is supplied from the oil pump 25. The ECU 3 is connected to the hydraulic control circuit 70.

The oil pump 25 sucks hydraulic oil retained in an oil pan (not illustrated in FIG. 1), pressurizes the sucked hydraulic oil, and then supplies the pressurized hydraulic oil to the hydraulic control circuit 70. The oil pump 25 includes, for example, a one-port oil pump in which an discharge port for discharging the hydraulic oil is provided at one position of the one-port oil. As described above, the oil pump 25 can be actuated by the power of the engine 1. Accordingly, the oil pump 25 discharges a larger amount of hydraulic oil when the number of rotations (rotation speed) of the engine 1 is increased, and discharges a smaller amount of hydraulic oil when the number of rotations of the engine 1 is decreased. The hydraulic control circuit 70 includes a plurality of hydraulic control valves such as a spool valve piece and an electromagnetic solenoid, and a plurality of oil passages. The ECU 3 controls the hydraulic control valves in an appropriate manner to control oil pressures in the respective oil passages.

Figure 2:
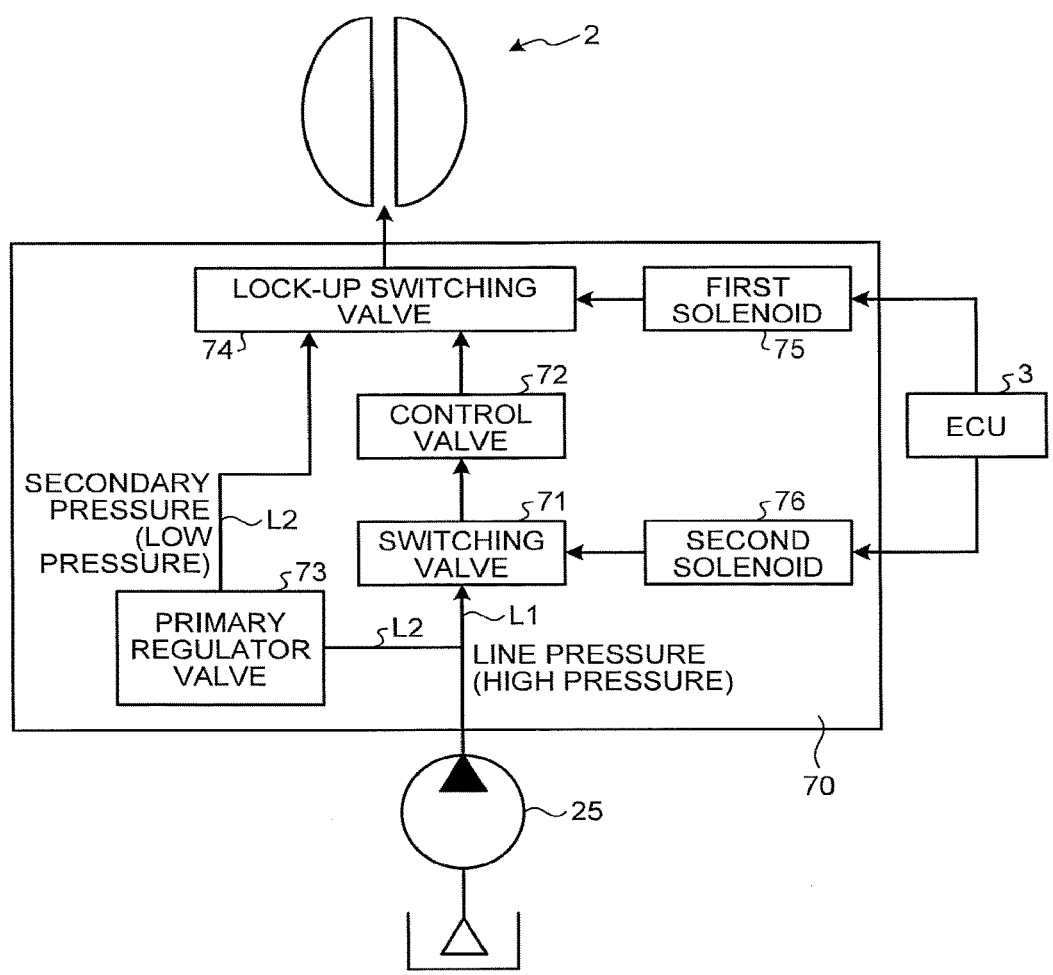
FIG. 2 is a diagram illustrating a configuration of the hydraulic control circuit according to the first embodiment of the present disclosure.

The hydraulic control circuit 70 in the hydraulic control device 13 is described. FIG. 2 is a block diagram mainly illustrating the hydraulic control circuit 70 according to the first embodiment. As illustrated in FIG. 2, the hydraulic control circuit 70 has a switching valve 71, a control valve 72, a primary regulator valve 73, a lock-up switching valve 74, a first solenoid 75, and a second solenoid 76. Each of the first solenoid 75 and the second solenoid 76 is a ON/OFF solenoid that is controlled to be ON/OFF by the ECU 3. A first oil passage L1 is formed of an oil passage through which the hydraulic oil discharged from the oil pump 25 flows sequentially in the switching valve 71, the control valve 72, and the lock-up switching valve 74. A second oil passage L2 is formed of an oil passage that branches off in the middle of the first oil passage L1 and through which the hydraulic oil flows sequentially in the primary regulator valve 73 and the lock-up switching valve 74.

Figure 3:
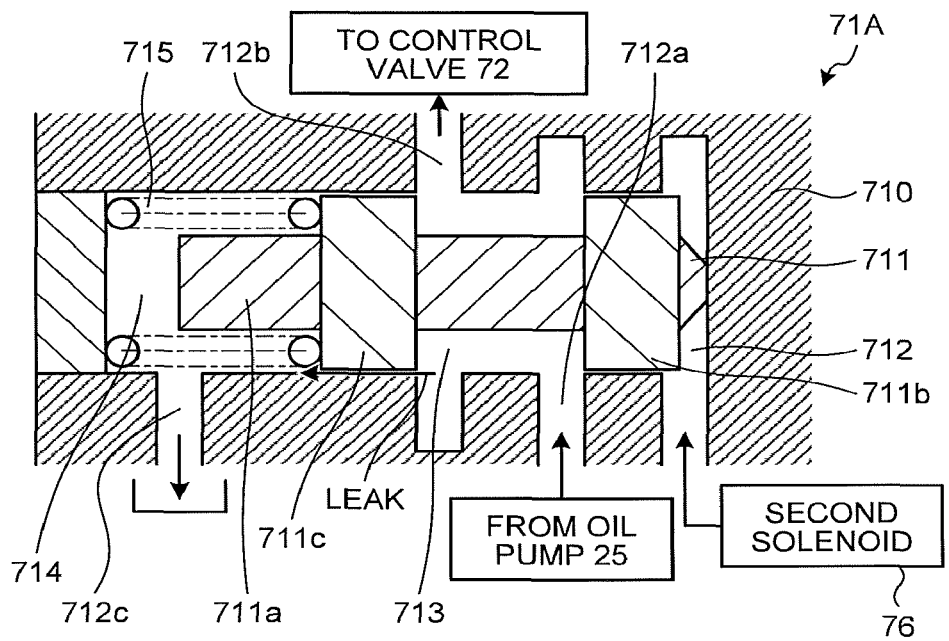
FIG. 3 is a cross-sectional view illustrating a configuration of a normally-open switching valve that is used in the hydraulic control circuit according to the first embodiment of the present disclosure and becomes an open valve state at a normal time.

The switching valve 71 is described. FIG. 3 illustrates a normally-open switching valve 71A adopted as the switching valve 71 according to the first embodiment. As illustrated in FIG. 3, the normally-open switching valve 71A has a body 710, a valve element 711, and a housing part 712. The housing part 712 is defined by the body 710 and accommodates the valve element 711. The valve element 711 includes a main shaft 711a having, for example, a cylindrical shape. The valve element 711 is reciprocally provided in an axial direction of the main shaft 711a in the housing part 712. The valve element 711 includes a first valve part 711b and a second valve part 711c which have a cylindrical shape and are formed in a concentric manner with the main shaft 711a. The outside diameters of the first valve part 711b and the second valve part 711c are larger than that of the main shaft 711a. The first valve part 711b and the second valve part 711c have substantially the same outside diameter and have substantially identical shapes in the respective cut surfaces in a direction perpendicular to the axial direction of the main shaft 711a. That is, the first valve part 711b and the second valve part 711c have substantially the same size in cross-section areas of the respective cut surfaces. The first valve part 711b and the second valve part 711c are placed to be separated from each other in the axial direction, so that an annular space 713 is formed between respective one end faces thereof. A clearance of a predetermined distance is formed between the first and second valve parts 711b and 711c and a wall surface of the body 710 that constitutes the housing part 712.

In the normally-open switching valve 71A, an inlet 712a and an outlet 712b of the hydraulic oil are formed that communicate with the housing part 712. The first oil passage L1 as a high-pressure oil passage connected to the oil pump 25 is connected to the inlet 712a. An oil passage to the control valve 72 is connected to the outlet 712b.

In the normally-open switching valve 71A, the inlet 712a and the outlet 712b are communicated via the annular space 713 to form a so-called open valve state when the second solenoid 76 is in an off-state. That is, the hydraulic oil can flow through the annular space 713. When the second solenoid 76 is in an on-state, the inlet 712a is blocked by the first valve part 711b to form a so-called closed valve state. That is, in the case where the normally-open switching valve 71A is used as the switching valve 71, the hydraulic oil discharged from the oil pump 25 can be supplied to the control valve 72 when the second solenoid 76 is in the off-state.

In the normally-open switching valve 71A, an elastic chamber 714 is provided in a space on the side of an end face of the second valve part 711c opposite to the first valve part 711b in the housing part 712. In the elastic chamber 714, an elastic member 715 is provided such as a coil spring that is compressed by the second valve part 711c in the closed valve state. When the hydraulic oil passes through the annular space 713, the hydraulic oil leaks into the elastic chamber 714 through the clearance described above. In the elastic chamber 714, a drain 712c is formed for discharging the hydraulic oil leaked from the annular space 713 to, for example, an oil pan. Due to formation of the drain 712c, the inside of the elastic chamber 714 is open to the atmosphere.

Figure 4:
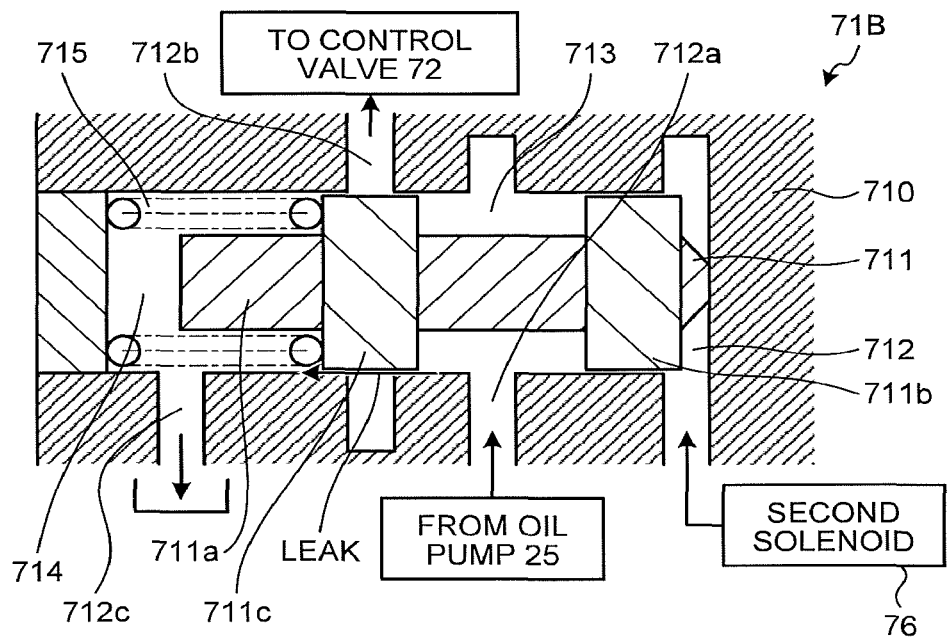
FIG. 4 is a cross-sectional view illustrating a configuration of a normally-closed switching valve that is used in the hydraulic control circuit according to the first embodiment of the present disclosure and becomes a closed valve state at a normal time.

A modification of the switching valve 71 is described next. FIG. 4 illustrates a normally-closed switching valve 71B that can be adopted as another modification of the switching valve 71 according to the first embodiment. As illustrated in FIG. 4, the normally-closed switching valve 71B has members identical to those used in the normally-open switching valve 71A described above. Therefore, the same members used in the normally-open switching valve 71A are used and repeated descriptions thereof are omitted.

In the normally-closed switching valve 71B, the inlet 712a and the outlet 712b are formed at positions shifted toward the second valve part 711c relative to those in the normally-open switching valve 71A. Accordingly, contrary to the normally-open switching valve 71A, the outlet 712b is blocked by the second valve part 711c to form a so-called closed valve state when the second solenoid 76 is in the off-state. When the second solenoid 76 is in the on-state, the outlet 712b is open by the second valve part 711c and the inlet 712a and the outlet 712b are communicated through the annular space 713 to form a so-called an open valve state. That is, in the case where the normally-closed switching valve 71B is used as the switching valve 71, the hydraulic oil discharged from the oil pump 25 can be supplied to the control valve 72 when the second solenoid 76 is in the on-state. Other configurations of the normally-closed switching valve 71B are identical to those in the normally-open switching valve 71A.

As illustrated in FIG. 2, the control valve 72 serving as an oil-pressure adjustment valve includes, for example, a circulation modulator valve and is a valve that adjusts and controls a circulatory pressure of the hydraulic oil circulated in the torque converter 2. The primary regulator valve 73 adjusts and controls the oil pressure of the hydraulic oil supplied from the oil pump 25. The hydraulic oil is supplied from the control valve 72 to the lock-up switching valve 74.

The lock-up switching valve 74 serving as a selection valve selectively switches between passing of the hydraulic oil at a high line pressure supplied from the control valve 72 and passing of the hydraulic oil at a low secondary pressure supplied from the primary regulator valve 73. The lock-up switching valve 74 is controlled by the first solenoid 75. Under a control of the ECU 3, the first solenoid 75 is switched between ON and OFF depending on the fastened state and the unfastened state of the lock-up clutch 23. Specifically, in the lock-up on state and the flex-controlled state, the ECU 3 controls the first solenoid 75 to be in the on-state to enable high-pressure hydraulic oil to be supplied to the torque converter 2 via the first oil passage L1 in which the oil pressure is set at a high line pressure and via the lock-up switching valve 74. On the other hand, in the lock-up off state, the ECU 3 controls the first solenoid 75 to be in the off-state to supply the secondary-pressure (low-pressure) hydraulic oil to the torque converter 2 via the second oil passage L2 in which the oil pressure is set at a low secondary pressure and via the lock-up switching valve 74.

The switching valve 71 is placed on an upstream side of the control valve 72 in the first oil passage L1 and a downstream side of a branch position of the second oil passage L2 branching off in the middle of the first oil passage L1 toward the primary regulator valve 73 in a flowing direction of the hydraulic oil. The switching valve 71 is controlled to be ON and OFF by the second solenoid 76 that is controlled by the ECU 3. In this example, the normally-open switching valve 71A is used as the switching valve 71. The second solenoid 76 is switched between ON and OFF according to the state of the lock-up clutch 23 under the control of the ECU 3.

Specifically, in the flex-controlled state, the second solenoid 76 is controlled by the ECU 3 to be in the off-state. In this case, the switching valve 71 is brought to the open valve state and thus the high-pressure hydraulic oil supplied from the control valve 72 is supplied to the torque converter 2. On the other hand, in the lock-up on state in which the lock-up clutch 23 is fastened, the second solenoid 76 is controlled by the ECU 3 to be in the on-state. In this case, the switching valve 71 is brought to the closed valve state, which stops the supply of the hydraulic oil to the torque converter 2.

Figure 5:
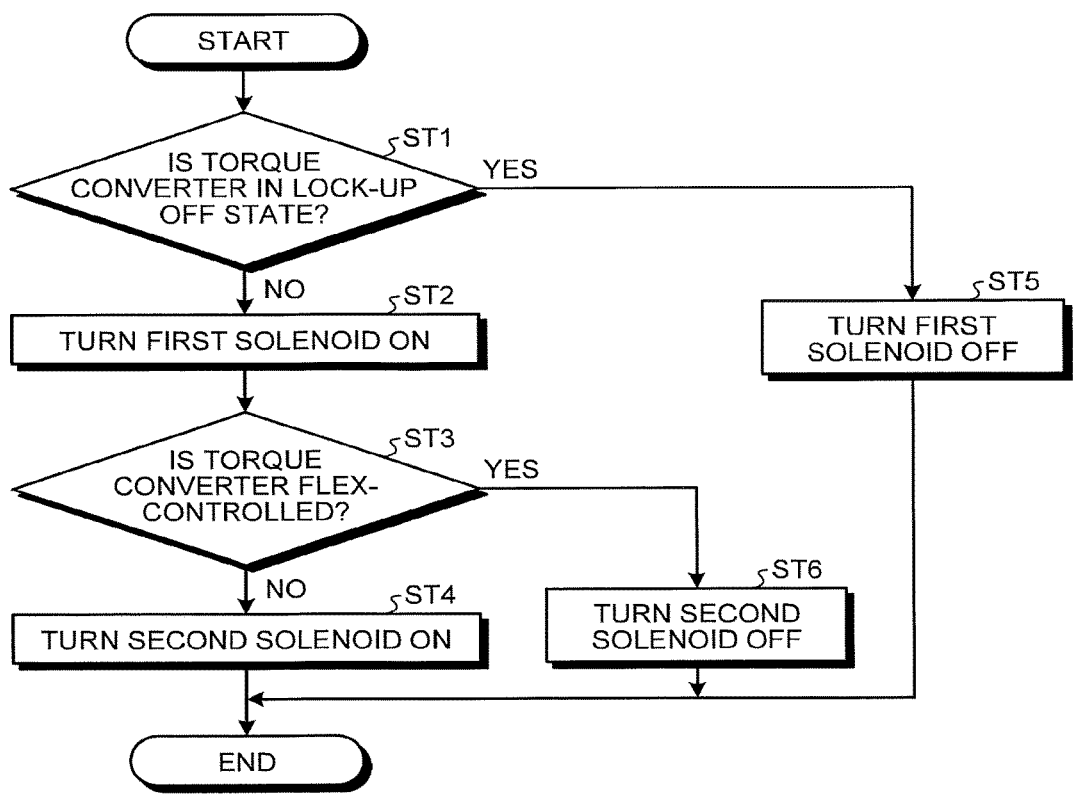
FIG. 5 is a flowchart explaining a control method of the hydraulic control circuit according to the first embodiment of the present disclosure.

FIG. 5 is a flowchart in a case of controlling the open/closed states of the switching valve 71 and the lock-up switching valve 74. Control procedure in the flowchart illustrated in FIG. 5 is repeatedly performed during the driving of the engine 1 of the vehicle Ve.

As illustrated in FIG. 5, the ECU 3 determines whether the torque converter 2 is in the lock-up off state in step ST1. When the ECU 3 determines that the torque converter 2 is not in the lock-up off state (NO in Step ST1), a process proceeds to step ST2. When not in the lock-up off state, the torque converter 2 is in the lock-up on state or the flex-controlled state. In step ST2, the ECU 3 controls the first solenoid 75 to be in the on-state. Accordingly, a state in which the high-pressure hydraulic oil can be supplied to the torque converter 2 via the lock-up switching valve 74 is formed.

Subsequently, a process proceeds to step ST3, where the ECU 3 determines whether the flex control is executed on the lock-up clutch 23, that is, whether the torque converter 2 is in the flex-controlled state. When the ECU 3 determines that the torque converter 2 is not in the flex-controlled state (NO in step ST3), a process proceeds to step ST4.

In step ST4, the ECU 3 controls the second solenoid 76 to be in the on-state. This brings the switching valve 71 to the closed valve state and thus the supply of the hydraulic oil to the torque converter 2 is stopped. This is because the torque converter 2 is in the lock-up on state and not in the flex-controlled state, and therefore the lock-up clutch 23 does not need to be cooled. Thereafter, the control process ends.

When the ECU 3 determines in step ST1 that the torque converter 2 is in the lock-up off state (YES in step ST1), a process proceeds to step ST5. In step ST5, the ECU 3 controls the first solenoid 75 to be in the off-state. Accordingly, the low-pressure hydraulic oil supplied from the primary regulator valve 73 is supplied to the torque converter 2 via the lock-up switching valve 74. Thereafter, the control process ends.

When the ECU 3 determines in step ST3 that the torque converter 2 is in the flex-controlled state (YES in step ST3), a process proceeds to step ST6. In step ST6, the ECU 3 controls the second solenoid 76 to be in the off-state. Accordingly, the switching valve 71 is brought to the open valve state and thus the high-pressure hydraulic oil from the control valve 72 is supplied to the torque converter 2. This is because the lock-up clutch 23 needs to be cooled in the case where the flex control is executed on the lock-up clutch 23. Thereafter, the control process ends.

The control process according to the first embodiment is performed in the manner described above. When the normally-closed switching valve 71B is used as the switching valve 71, the ON and OFF states in the control on the second solenoid 76 executed by the ECU 3 are inverted in the control process illustrated in FIG. 5 described above.

Figure 6:
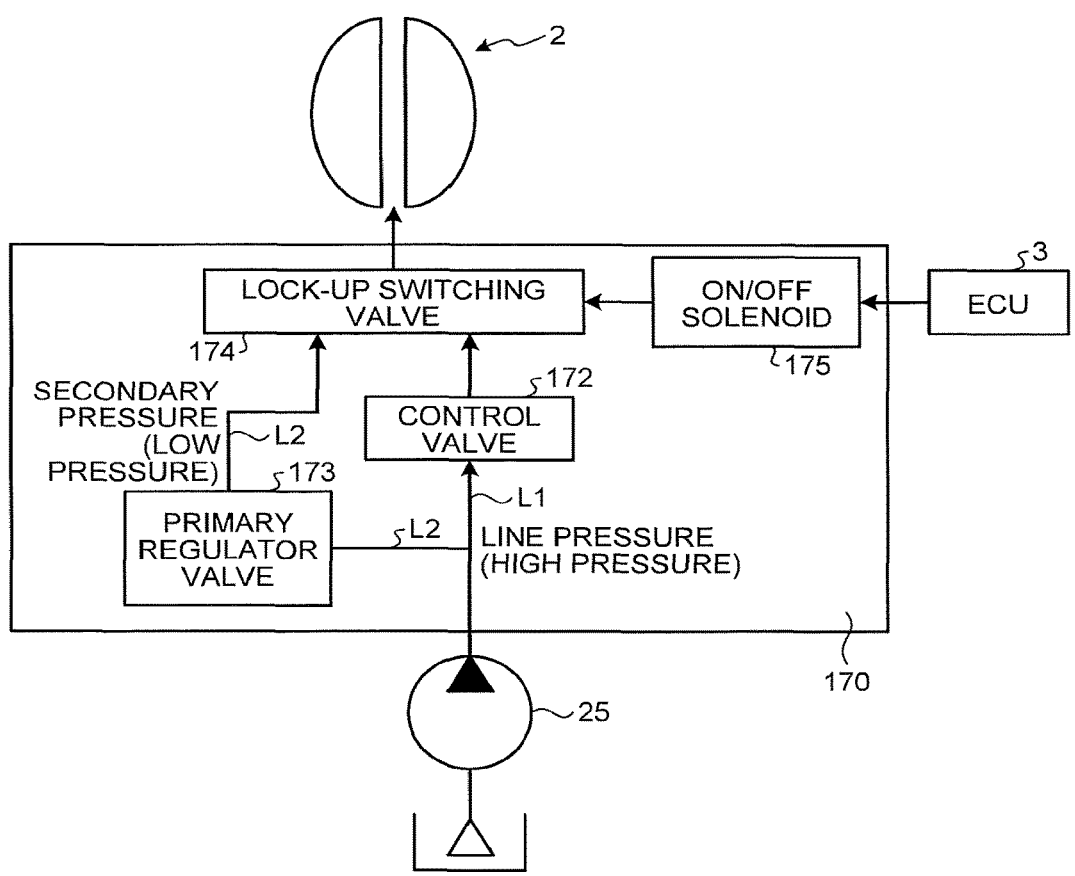
FIG. 6 is a diagram illustrating a configuration of a conventional hydraulic control circuit.

A conventional hydraulic control circuit as a comparison example is described next to describe effects of the first embodiment. FIG. 6 illustrates a hydraulic control circuit according to a conventional technique. As illustrated in FIG. 6, a conventional hydraulic control circuit 170 includes a control valve 172, a primary regulator valve 173, a lock-up switching valve 174, and an ON/OFF solenoid 175. The ON/OFF solenoid 175 is controlled to be ON/OFF by the ECU 3. The hydraulic oil from the oil pump 25 is supplied to the control valve 172 that is provided on a downstream side of a branch point of the second oil passage L2 from the first oil passage L1. Other elements of the hydraulic control circuit 170 are identical to those of the hydraulic control circuit 70 described above.

The conventional hydraulic control circuit 170 illustrated in FIG. 6 may have a problem that a large amount of hydraulic oil leaks in the control valve 172 and the lock-up switching valve 74. In contrast thereto, according to the first embodiment described above, the switching valve 71 is positioned on the upstream side of the control valve 72 and the lock-up switching valve 74 on the first oil passage L1 as illustrated in FIG. 2. Accordingly, when the hydraulic oil flowing through the high-pressure first oil passage L1 is interrupted by the switching valve 71, the supply of the high-pressure hydraulic oil to the control valve 72 and the lock-up switching valve 74 is stopped. Therefore, the leakages of the hydraulic oil in the control valve 72 and the lock-up switching valve 74 can be greatly reduced. When the hydraulic oil flowing through the high-pressure first oil passage L1 is interrupted by the switching valve 71, the hydraulic oil may leak from the switching valve 71. However, a leakage amount of the hydraulic oil from the switching valve 71 is much less than that from the control valve 72 and the lock-up switching valve 74. Therefore, a total leakage amount of the hydraulic oil from the various valves provided in the hydraulic control circuit 70 can be reduced.

When the conventional hydraulic control circuit 170 illustrated in FIG. 6 has a configuration in which the hydraulic oil to be supplied to the torque converter 2 is always low-pressure hydraulic oil supplied from the primary regulator valve 173, the supply of the high-pressure hydraulic oil to the torque converter 2 is not required and thus the amount of the hydraulic oil discharged from the oil pump 25 can be reduced. However, during execution of the flex control on the lock-up clutch 23, the lock-up clutch 23 needs to be cooled. In this case, just supplying the low-pressure hydraulic oil to the torque converter 2 may fail to supply an amount of the hydraulic oil required for the cooling. In contrast, according to the first embodiment described above, the high-pressure hydraulic oil can be supplied to the torque converter 2 during execution of the flex control on the lock-up clutch 23. In this way, at a time when the lock-up clutch 23 needs to be cooled, a deficiency in the supply amount of the hydraulic oil required for the cooling can be suppressed.

Figure 7:
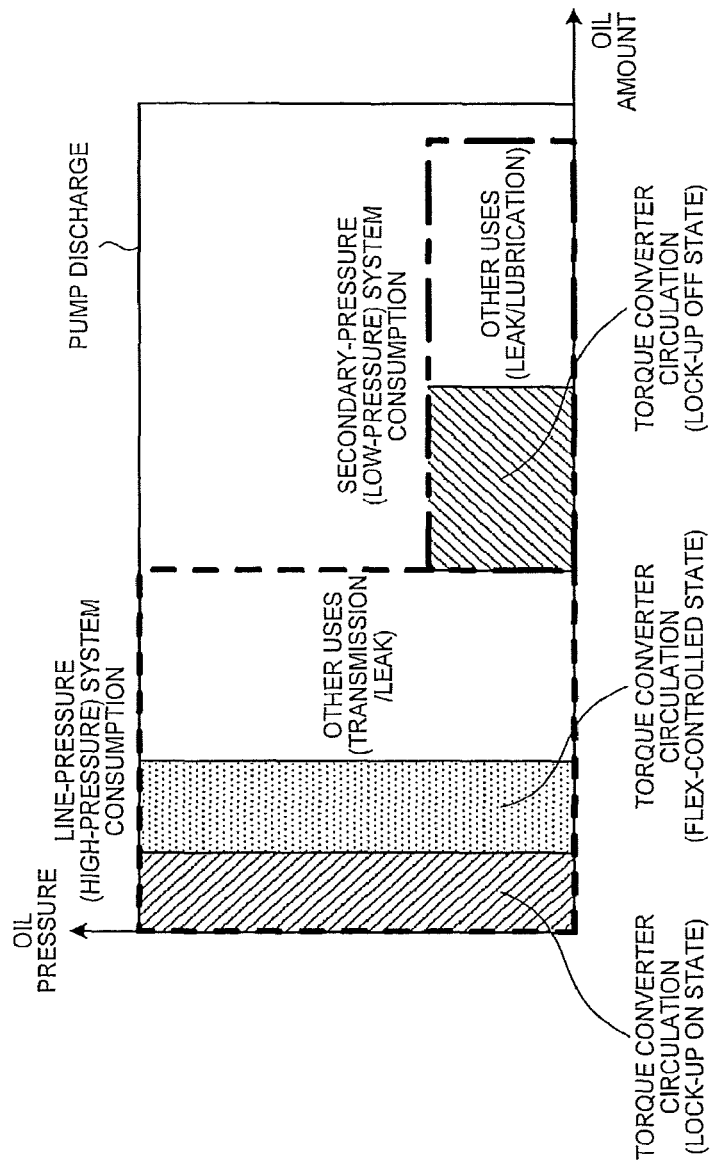
FIG. 7 is a graph illustrating details of energy consumption of an oil pump that supplies hydraulic oil to the conventional hydraulic control circuit.
Figure 8:
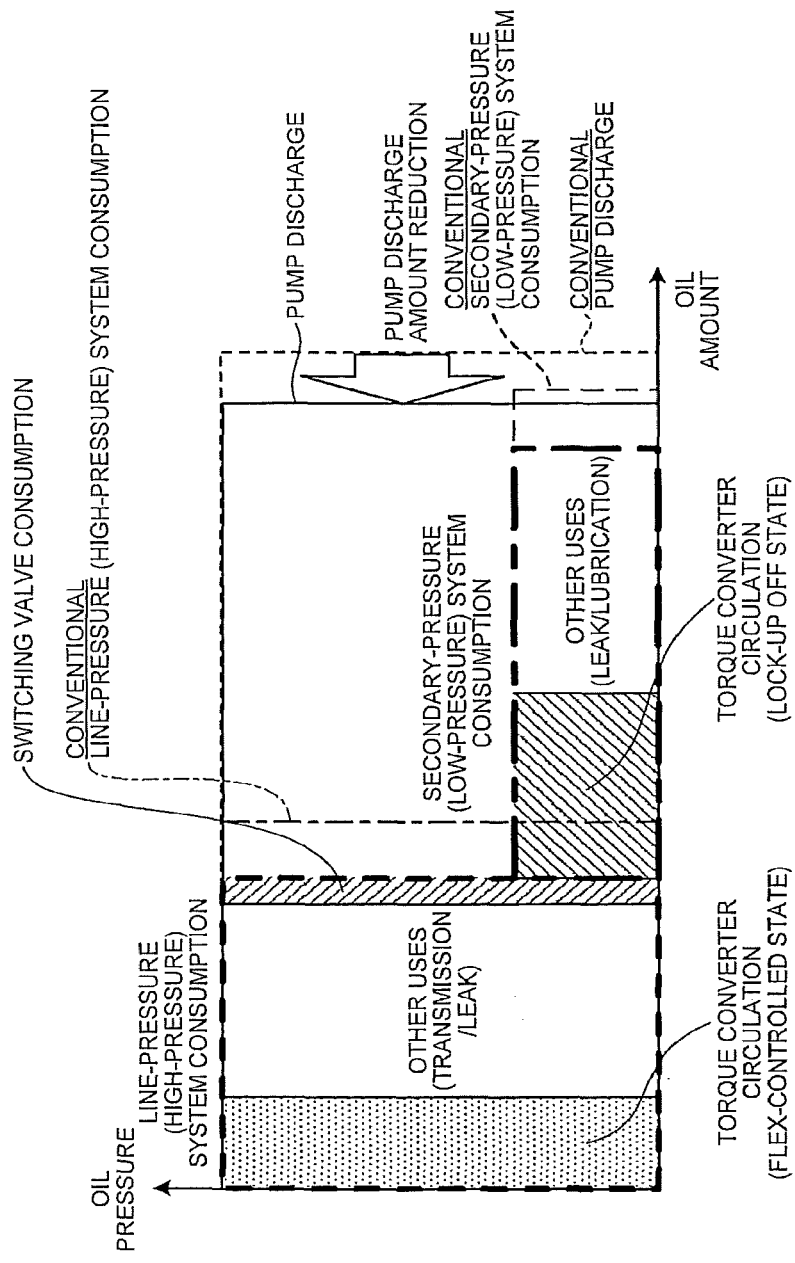
FIG. 8 is a graph illustrating details of energy consumption of an oil pump in the hydraulic control circuit according to the first embodiment of the present disclosure.

FIG. 7 is a graph illustrating an energy consumption of the oil pump 25 in the conventional hydraulic control circuit 170 described above. FIG. 8 is a graph illustrating an energy consumption of the oil pump 25 in the hydraulic control circuit 70 according to the first embodiment described above. In FIGS. 7 and 8, the horizontal axis represents the oil amount and the vertical axis represents the oil pressure.

As illustrated in FIG. 7, in the conventional hydraulic control circuit 170, the hydraulic oil at the line pressure (high pressure) in the hydraulic oil supplied from the oil pump 25 to the torque converter 2 is used as follows. That is, the hydraulic oil at the line pressure is used for circulation (hereinafter, "a torque converter circulation" in FIG. 7) in the torque converter 2 in the lock-up on state, circulation in the torque converter 2 in the flex-controlled state, and other uses such as transmission and leak. As for the oil pressure and the oil amount illustrated in FIG. 7, the oil pressure is an average value during travelling of the vehicle Ve for a predetermined time and the oil amount is an integrated amount during the travelling of the vehicle Ve for a predetermined time. The same holds true for the following graphs of energy consumption. Energy consumed by the oil pump 25 to discharge the line-pressure hydraulic oil corresponds to a portion (line-pressure (high-pressure) system consumption) enclosed by a heavy broken line in FIG. 7.

In the conventional hydraulic control circuit 170, the hydraulic oil at the secondary pressure (low pressure) in the hydraulic oil supplied from the oil pump 25 to the torque converter 2 is used for circulation in the torque converter 2 in the lock-up off state and other uses such as lubrication and leak. Energy consumed by the oil pump 25 to discharge the secondary-pressure hydraulic oil corresponds to a portion (secondary-pressure (low-pressure) system consumption) enclosed by a heavy-dashed dotted line in FIG. 7. Total energy consumed by the oil pump 25 to discharge the hydraulic oil corresponds to a portion (pump discharge) enclosed by a thin solid line in FIG. 7.

In contrast thereto, as illustrated in FIG. 8, in the hydraulic control circuit 70 according to the first embodiment, the hydraulic oil at the line pressure (high pressure) supplied from the oil pump 25 to the torque converter 2 is used as follows. That is, the line-pressure hydraulic oil is used for circulation (torque converter circulation in FIG. 8) in the torque converter 2 in the flex-controlled state, other uses such as transmission and leak, and leak from the switching valve 71 (switching valve consumption). The energy consumed by the oil pump 25 to discharge the line-pressure hydraulic oil corresponds to a portion (line-pressure (high-pressure) system consumption) enclosed by a heavy broken line in FIG. 8.

That is, in the first embodiment, the supply of the hydraulic oil to the torque converter 2 is stopped by the switching valve 71 in the lock-up on state. This can reduce the energy consumed by the oil pump 25 by an amount of the hydraulic oil circulated in the torque converter 2 in the lock-up on state relative to that in the conventional hydraulic control circuit 170. Furthermore, because the switching valve 71 is installed on the upstream side of the control valve 72, supply of the high-pressure hydraulic oil to the control valve 72 and the lock-up switching valve 74 can be stopped when the switching valve 71 interrupts the flow of the hydraulic oil. Accordingly, the leakages of the hydraulic oil from the control valve 72 and the lock-up switching valve 74 can be reduced and thus the energy consumed by the oil pump 25 can be reduced by the reduction of the leakages of the hydraulic oil. Meanwhile, the provision of the switching valve 71 causes a leakage of the hydraulic oil from the switching valve 71. Therefore, the energy consumed by the oil pump 25 is increased by the leakage of the hydraulic oil from the switching valve 71. However, the energy consumed by the oil pump 25 for the leakage of the hydraulic oil from the switching valve 71 is quite less than the energy consumed by the oil pump 25 to circulate the hydraulic oil in the torque converter 2. Accordingly, the energy consumed by the oil pump 25 to discharge the line-pressure hydraulic oil can be reduced. In FIG. 8, a portion corresponding to the conventional line-pressure system consumption is indicated by a thin-dashed dotted line and a portion corresponding to the conventional secondary-pressure system consumption is indicated by a long broken line, which indicates that energy of the line-pressure system consumption is particularly reduced.

In the hydraulic control circuit 70 according to the first embodiment, the hydraulic oil at the secondary pressure (low pressure) supplied from the oil pump 25 to the torque converter 2 is used for circulation in the torque converter 2 in the lock-up off state and other uses such as lubrication and leak. Energy consumed by the oil pump 25 for the secondary-pressure hydraulic oil corresponds to a portion (secondary-pressure (low-pressure) system consumption) enclosed by a heavy-dashed dotted line in FIG. 8. The energy of the secondary-pressure system consumption enclosed by the heavy-dashed dotted line is identical to that in the conventional hydraulic control circuit 170. In FIG. 8, the portion of the conventional secondary-pressure system consumption is indicated by the long broken line.

In the hydraulic control circuit 70 according to the first embodiment, total energy consumed by the oil pump 25 to discharge the hydraulic oil including losses in the various valves and the like corresponds to a portion (pump discharge) enclosed by a thin solid line in FIG. 8. That is, in the hydraulic control circuit 70, an amount of energy obtained by subtracting the energy consumed for the leakage of the hydraulic oil from the switching valve 71 from the energy consumed to circulate the hydraulic oil in the torque converter 2 in the lock-up on state is reduced relative to the conventional hydraulic control circuit 170.

Furthermore, the conventional hydraulic control circuit 170 may have a problem that a larger capacity of the oil pump 25 is required because the lock-up switching valve 174 is brought to the on-state in the lock-up on state and the high-pressure hydraulic oil from the oil pump 25 needs to be supplied thereto. In contrast thereto, according to the first embodiment described above, the discharge amount (pump discharge in FIG. 8) of the oil pump 25 in a case where the hydraulic oil is supplied to the hydraulic control circuit 70 is reduced relative to the discharge amount (the conventional pump discharge in FIG. 8) of the oil pump 25 in a case where the hydraulic oil is supplied to the conventional hydraulic control circuit 170. This can reduce the required capacity of the oil pump 25 and thus can downscale the oil pump 25.

Modification of First Embodiment

Figure 9:
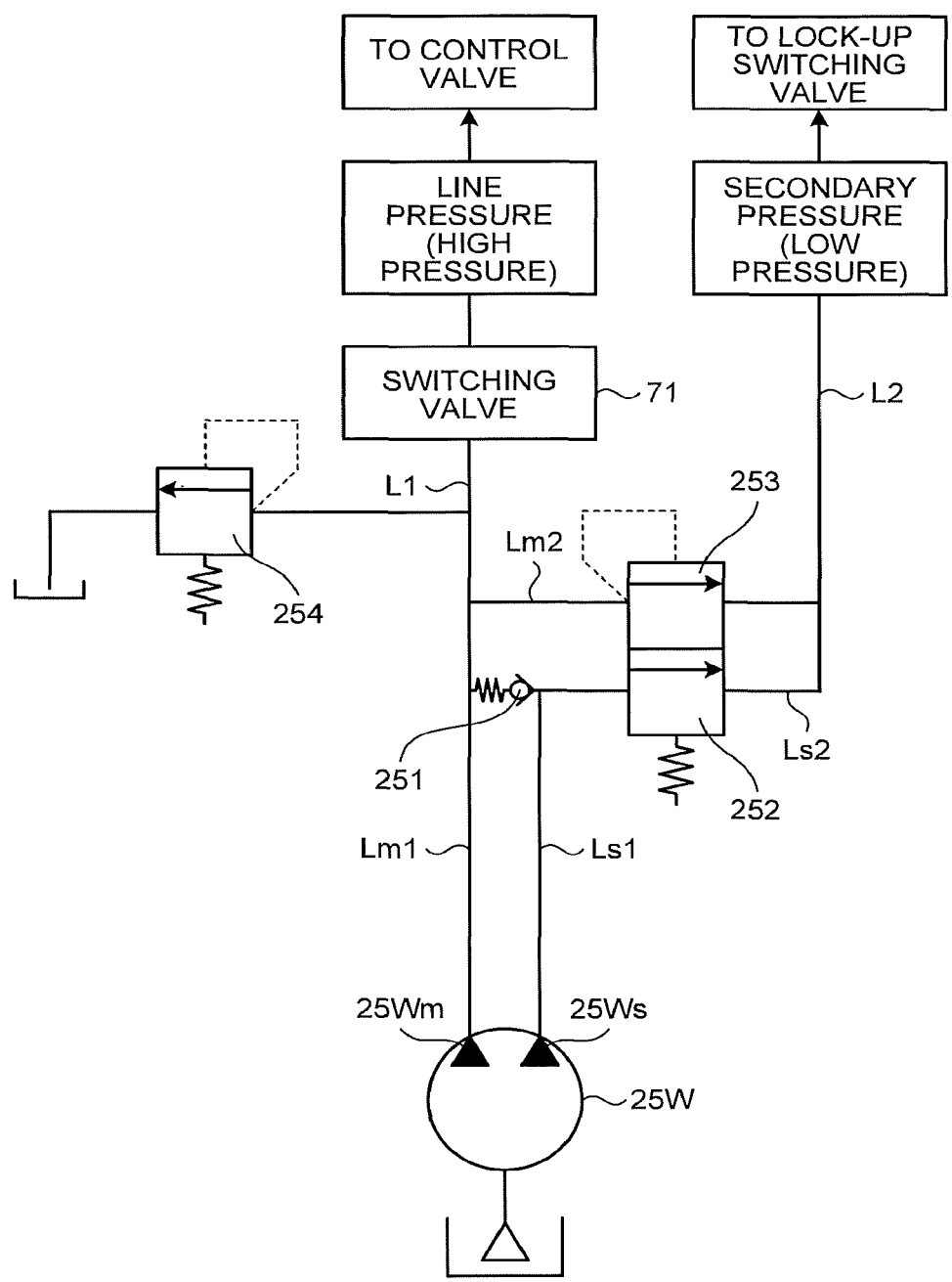
FIG. 9 is a diagram illustrating a configuration of a two-port oil pump according to a modification of the first embodiment of the present disclosure.

A modification of the first embodiment is described next. In this modification, a two-port oil pump 25W having discharge ports of hydraulic oil at two positions is used instead of the one-port oil pump 25 having the discharge port at one position. A configuration of a mechanical oil pump (MOP) system using the two-port oil pump 25W is described below. FIG. 9 illustrates a configuration of the MOP system using the two-port oil pump 25W.

As illustrated in FIG. 9, the MOP system includes the two-port oil pump 25W, a non-return valve 251, primary regulator valves 252 and 253, a check valve 254, and the switching valve 71. The two-port oil pump 25W has two ports including a main port 25Wm and a sub port 25Ws. In the two-port oil pump 25W, the main port 25Wm discharges hydraulic oil that has an oil pressure being a line pressure as a first oil pressure. The sub port 25Ws selectively discharges hydraulic oil that has an oil pressure being the secondary pressure as a second oil pressure and hydraulic oil having an oil pressure being the line pressure. That is, the oil pressure of the hydraulic oil discharged from the sub port 25Ws can be switched between the line pressure and the secondary pressure.

Whether the oil pressure of the hydraulic oil discharged from the sub port 25Ws in the two-port oil pump 25W is the line pressure or the secondary pressure depends on following conditions. That is, when a discharge flow rate Qmain of the hydraulic oil from the main port 25Wm is less than a required flow rate of the line-pressure hydraulic oil, the oil pressure of the hydraulic oil discharged from the sub port 25Ws is the line pressure. When the discharge flow rate Qmain of the main port 25Wm is equal to or greater than the required flow rate of the line-pressure hydraulic oil, the oil pressure of the hydraulic oil discharged from the sub port 25Ws is the secondary pressure.

The non-return valve 251 supplies the line-pressure hydraulic oil from a first sub oil passage Ls1 connected to the sub port 25Ws to a first main oil passage Lm1 connected to the main port 25Wm when the oil pressure of the hydraulic oil discharged from the sub port 25Ws is the line pressure. That is, the first sub oil passage Ls1 is connected to the first main oil passage Lm1 and a first oil passage L1 via the non-return valve 251. The non-return valve 251 does not supply the hydraulic oil from the first main oil passage Lm1 to the first sub oil passage Ls1.

The primary regulator valve 252 is connected to the first sub oil passage Ls1. When the oil pressure of the hydraulic oil discharged from the sub port 25Ws is the secondary pressure, the primary regulator valve 252 passes the hydraulic oil therethrough to supply the secondary-pressure hydraulic oil to a second sub oil passage Ls2 and a second oil passage L2 connected to the second sub oil passage Ls2. When the oil pressure of the hydraulic oil discharged from the sub port 25Ws is the line pressure, the primary regulator valve 252 adjusts the hydraulic oil to the secondary pressure lower than the line pressure and outputs the secondary-pressure hydraulic oil while supplying the line-pressure hydraulic oil to the first main oil passage Lm1 via the non-return valve 251.

The primary regulator valve 253 has a configuration identical to that of the primary regulator valves 73 and 173 described above and is a valve for adjusting and controlling the oil pressure of the hydraulic oil supplied from the main port 25Wm of the two-port oil pump 25W. The primary regulator valve 253 is connected to a second main oil passage Lm2 branching off from the first main oil passage Lm1. The check valve 254 is a valve for discharging the hydraulic oil when the oil pressure in the first main oil passage Lm1 exceeds a predetermined value, thereby preventing the oil pressure from exceeding the predetermine value.

In the two-port MOP system, the first main oil passage Lm1 is connected to the first oil passage L1 in the first embodiment and the first main oil passage Lm1 forms a part of the first oil passage L1. The second main oil passage Lm2 is connected to the second oil passage L2 and the second main oil passage Lm2 forms a part of the second oil passage L2. When the two-port oil pump 25W is used as an oil pump, the switching valve 71 is provided on a downstream side of a branch point of the second main oil passage Lm2 connected to the second oil passage L2 from the first main oil passage Lm1 connected to the first oil passage L1. When the two-port oil pump 25W is used as the oil pump that supplies the hydraulic oil to the hydraulic control circuit 70, the ling-pressure hydraulic oil is supplied from the first oil passage L1 connected to the first main oil passage Lm1 to the control valve 72 via the switching valve 71. Accordingly, in the lock-up on state, supply of the hydraulic oil to the control valve 72 is interrupted by the switching valve 71. In this case, the flow rate of the hydraulic oil flowing through the first oil passage L1 becomes zero and thus the discharge flow rate Qmain of the hydraulic oil from the main port 25Wm is equal to or greater than the required flow rate of the line-pressure hydraulic oil. Therefore, the oil pressure of the hydraulic oil discharged from the sub port 25Ws is set to the secondary pressure. Accordingly, in a case where supply of the hydraulic oil to the torque converter 2 is not required, the low-pressure hydraulic oil is discharged from the sub port 25Ws and the frequency of discharge of the high-pressure hydraulic oil is lowered, which reduces the loss in the two-port oil pump 25W.

Figure 10:
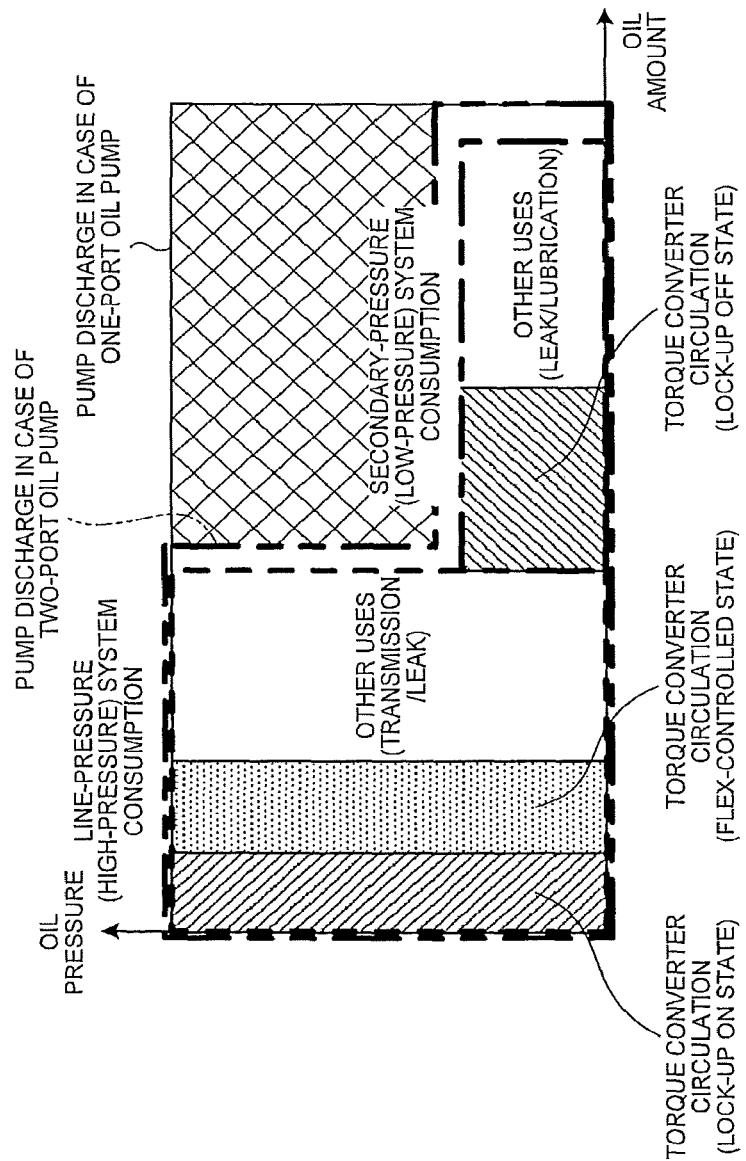
FIG. 10 is a graph illustrating details of energy consumption of a two-port oil pump in the conventional hydraulic control circuit.
Figure 11:
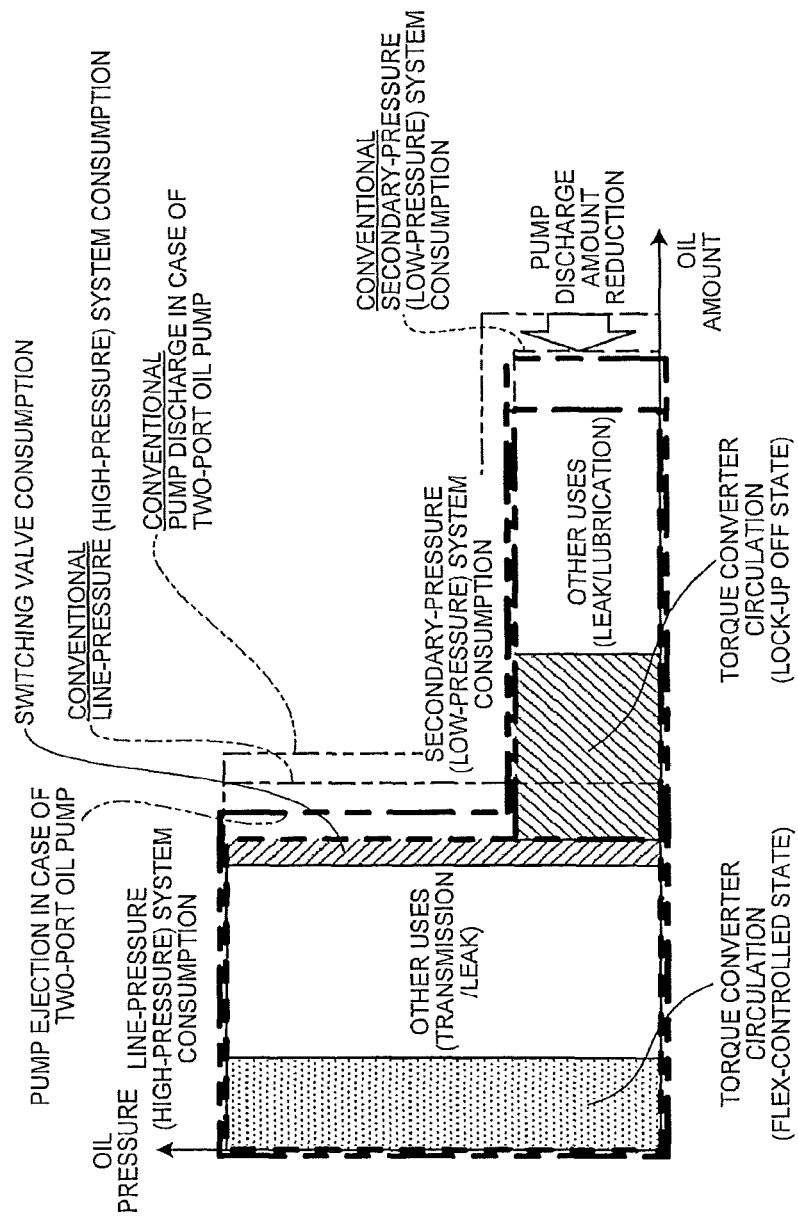
FIG. 11 is a graph illustrating details of energy consumption of the two-port oil pump in the hydraulic control circuit according to the modification of the first embodiment of the present disclosure.

FIG. 10 is a graph illustrating an energy consumption of the oil pump in the conventional hydraulic control circuit 170 described above when the two-port oil pump 25W is used as the oil pump. FIG. 11 is a graph illustrating an energy consumption of the oil pump in the hydraulic control circuit 70 according to the first embodiment described above when the two-port oil pump 25W is used as the oil pump. In FIGS. 10 and 11, the horizontal axis represents the oil amount and the vertical axis represents the oil pressure.

As illustrated in FIG. 10, when the two-port oil pump 25W is used instead of the oil pump 25 in the conventional hydraulic control circuit 170, the energy consumed by the two-port oil pump 25W to discharge the hydraulic oil is a portion of pump discharge (pump discharge in a case of the two-port oil pump) enclosed by a heavy-dashed double-dotted line in FIG. 10. In FIG. 10, the pump discharge in a case where the oil pump 25 is the one-port oil pump is indicated by a thin solid line, and the consumed energy in line-pressure system consumption and the secondary-pressure system consumption are identical to those in the conventional case illustrated in FIG. 7 described above. Also in the conventional hydraulic control circuit 170, when the two-port oil pump 25W is used as the oil pump, the energy consumption of the oil pump can be reduced by a difference (a lattice portion in FIG. 10) between the thin solid line indicating the pump discharge in the case of the one-port oil pump and the heavy-dashed double-dotted line indicating the pump discharge in the case of the two-port oil pump.

As illustrated in FIG. 11, when the two-port oil pump 25W is used instead of the oil pump 25 in the hydraulic control circuit 70, the energy consumed by the two-port oil pump 25W to discharge the hydraulic oil corresponds to a portion (pump discharge in a case of the two-port oil pump) enclosed by a heavy-dashed double-dotted line in FIG. 11. Furthermore, because the oil amount discharged from the main port 25Wm is reduced relative to that in the conventional hydraulic control circuit 170, a ratio (a main port ratio) of the discharge oil amount of the main port 25Wm to that of the two-port oil pump 25W can be reduced. In this way, also in the case where the two-port oil pump 25W is used as the oil pump, the required capacity of the main port 25Wm can be reduced.

Figure 12:
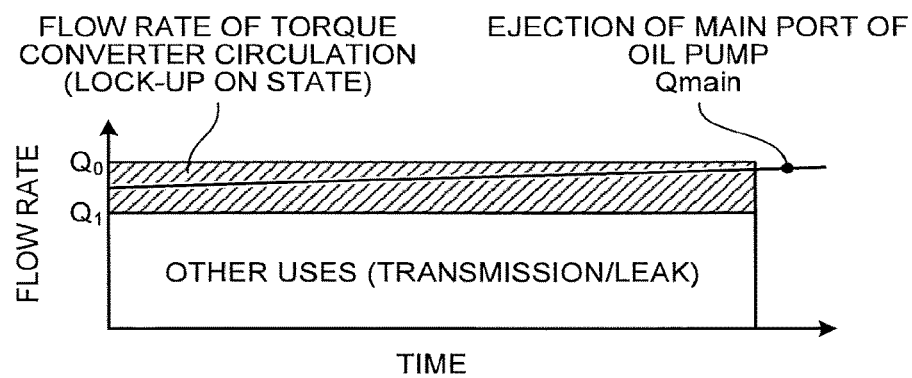
FIG. 12 is a graph illustrating details of a flow rate of hydraulic oil when a vehicle according to the modification of the first embodiment of the present disclosure travels.

FIG. 12 is a graph illustrating a flow rate of the line-pressure hydraulic oil to be used by the torque converter 2, the clutch mechanism 4, the transmission 5, and the like according to a traveling time in a case where the vehicle Ve travels for a predetermined time when the two-port oil pump 25W is used as the oil pump. In FIG. 12, a hatched portion indicates a flow rate (a flow rate of torque converter circulation) of the hydraulic oil circulating in the torque converter 2 in the lock-up on state. A solid line indicates an example (discharge of main port of oil pump) of a change in the discharge flow rate Qmain of the main port 25Wm.

As illustrated in FIG. 12, when the hydraulic oil is supplied to the torque converter 2 in the lock-up on state as in the conventional technique, a required flow rate $Q_0$ of the line-pressure hydraulic oil is greater than the discharge flow rate Qmain of the hydraulic oil from the main port 25Wm in many cases. In these cases, situations where the line-pressure hydraulic oil is insufficient are increased and thus the frequency of the oil pressure of the hydraulic oil discharged from the sub port 25Ws becoming the line pressure is increased. In contrast, in the first embodiment, because the supply of the hydraulic oil to the torque converter 2 in the lock-up on state is stopped, the hatched portion of the flow rate in FIG. 12 is not required. Accordingly, a required flow rate $Q_1$ of the line-pressure hydraulic oil in the state where the supply of the hydraulic oil to the torque converter 2 is stopped is less than the discharge flow rate Qmain of the hydraulic oil from the main port 25Wm. This increases the frequency of discharge from the sub port 25Ws of the hydraulic oil at the secondary pressure lower than the line pressure. Therefore, the drive torque of the two-port oil pump 25W can be reduced and thus the transmission efficiency of the transmission 5 can be enhanced.

Second Embodiment

Figure 13:
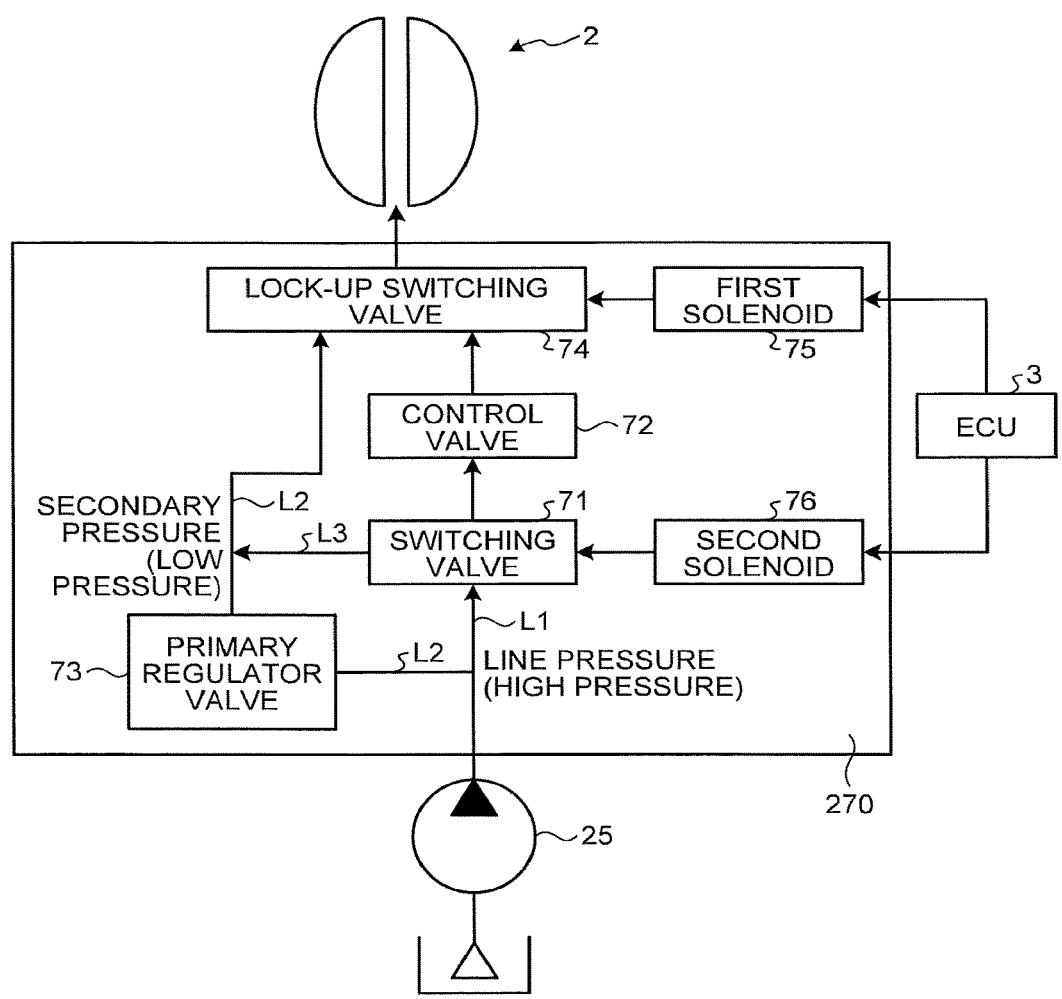
FIG. 13 is a diagram illustrating a configuration of a hydraulic control circuit according to a second embodiment of the present disclosure.
Figure 14:
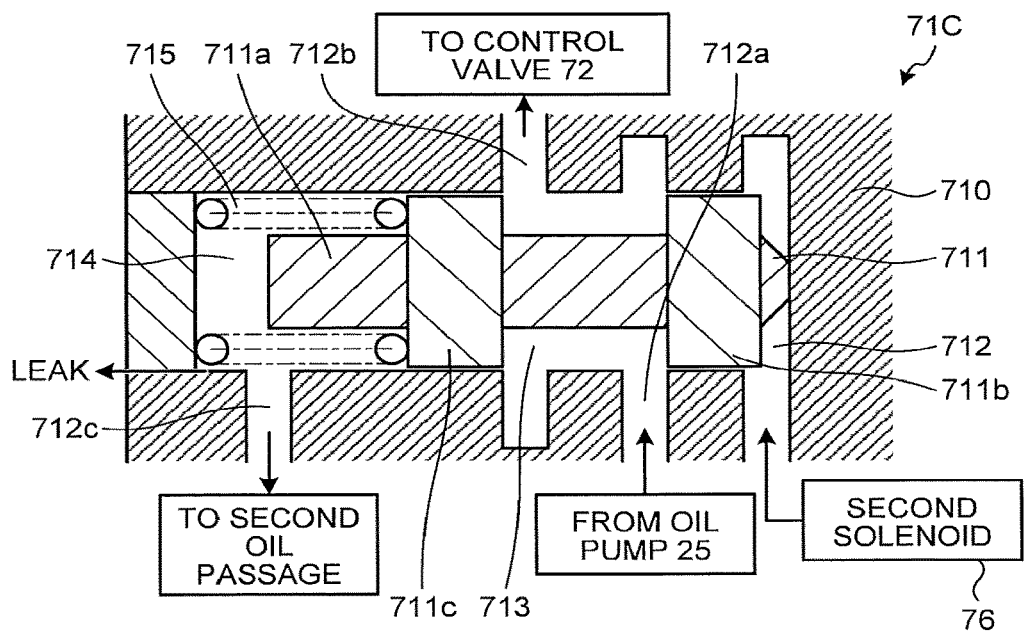
FIG. 14 is a cross-sectional view illustrating a configuration of a normally-open switching valve that is used in the second embodiment of the present disclosure and becomes an open valve state at a normal time.
Figure 15:
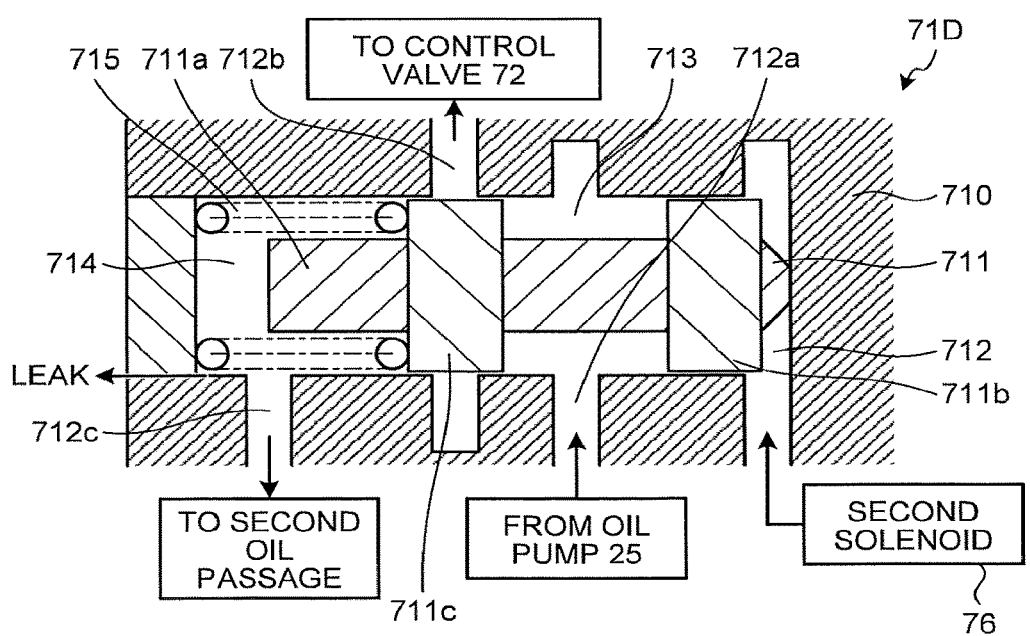
FIG. 15 is a cross-sectional view illustrating a configuration of a normally-closed switching valve that is used in the second embodiment of the present disclosure and becomes a closed valve state at a normal time.

A hydraulic control circuit according to a second embodiment of the present disclosure is described. FIG. 13 is a block diagram illustrating a hydraulic control circuit according to the second embodiment. FIG. 14 illustrates a normally-open switching valve according to the second embodiment. FIG. 15 illustrates a normally-closed switching valve according to the second embodiment.

In a hydraulic control circuit 270 according to the second embodiment, a third oil passage L3 is connected to the switching valve 71 as illustrated in FIG. 13. The third oil passage L3 is connected to the second oil passage L2 at the secondary pressure. Other elements of the hydraulic control circuit 270 are identical to those of the hydraulic control circuit 70 according to the first embodiment.

As illustrated in FIG. 14, in a normally-open switching valve 71C according to the second embodiment, a drain 712c formed to be communicated with the elastic chamber 714 is connected to the second oil passage L2 via the third oil passage L3. Accordingly, the elastic chamber 714 is filled with the hydraulic oil at the secondary pressure which is the oil pressure of the second oil passage L2. Other configurations of the normally-open switching valve 71C are identical to those of the normally-open switching valve 71A according to the first embodiment.

Meanwhile, as illustrated in FIG. 15, also in a normally-closed switching valve 71D according to the second embodiment, the drain 712c formed to be communicated with the elastic chamber 714 is similarly connected to the second oil passage L2 via the third oil passage L3 and the elastic chamber 714 is filled with the hydraulic oil at the secondary pressure. Other configurations of the normally-closed switching valve 71D are identical to those of the normally-closed switching valve 71B according to the first embodiment.

Figure 16:
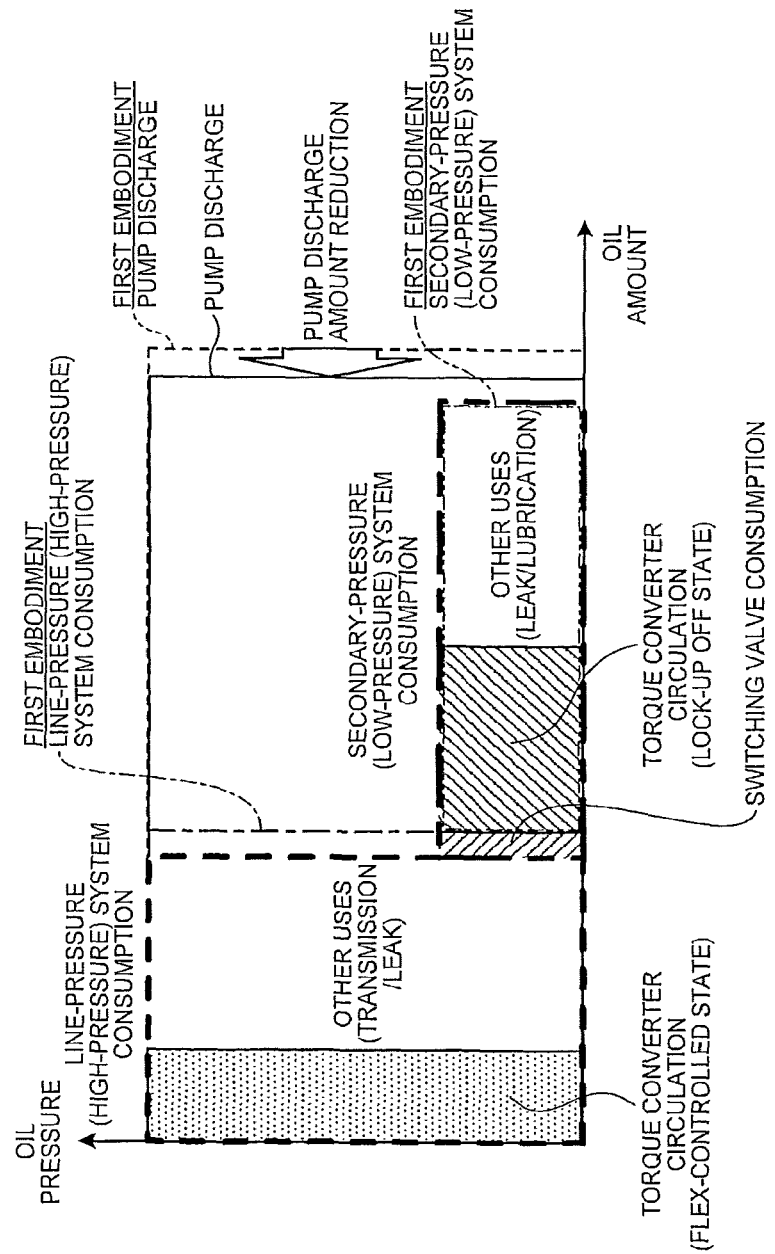
FIG. 16 is a graph illustrating details of energy consumption of an oil pump in the hydraulic control circuit according to the second embodiment of the present disclosure.

The energy consumption of the oil pump 25 in the hydraulic control circuit 270 according to the second embodiment is illustrated in FIG. 16. As illustrated in FIG. 16, in the hydraulic control circuit 270, the line-pressure (high-pressure) hydraulic oil supplied from the oil pump 25 to the torque converter 2 is used for circulation (torque converter circulation in FIG. 16) in the torque converter 2 in the flex-controlled state, and other uses such as transmission and leak. The energy consumed by the oil pump 25 to discharge the line-pressure hydraulic oil corresponds to a portion (line-pressure (high-pressure) system consumption) enclosed by a heavy dashed line in FIG. 16.

In the first embodiment, the amount of the line-pressure hydraulic oil leaked from the annular space 713, through which the hydraulic oil passes, to the elastic chamber 714 in the switching valve 71 corresponds to the leakage of the hydraulic oil caused by provision of the switching valve 71 as illustrated in FIGS. 3 and 4. In contrast, in the second embodiment, the drain 712c of the switching valve 71 is communicated with the second oil passage L2 as illustrated in FIGS. 14 and 15. Accordingly, the hydraulic oil leaked from the annular space 713 to the elastic chamber 714 is supplied to the second oil passage L2 and is used as the secondary-pressure hydraulic oil. Therefore, the leakage of the hydraulic oil from the switching valve 71 corresponds to an amount of the secondary-pressure hydraulic oil in the elastic chamber 714 leaked outside the switching valve 71.

As illustrated in FIG. 16, the leakage of the hydraulic oil from the switching valve 71 corresponds to the leakage of the secondary-pressure hydraulic oil. Accordingly, the energy consumed by the oil pump 25 can be reduced relative to the case of the leakage from the switching valve 71 according to the first embodiment. In FIG. 16, a portion corresponding to the line-pressure system consumption in the first embodiment is indicated by a thin-dashed dotted line, which indicates that the energy of line-pressure system consumption of the oil pump 25 is reduced.

In the hydraulic control circuit 270 according to the second embodiment, the secondary-pressure hydraulic oil supplied from the oil pump 25 to the torque converter 2 is used for the leakage from the switching valve 71, the circulation in the torque converter 2 when the lock-up clutch 23 is in the lock-up off state, and other uses such as lubrication and leak. The energy consumed by the oil pump 25 for the secondary-pressure hydraulic oil corresponds to a portion (secondary-pressure (low-pressure) system consumption) enclosed by a heavy-dashed dotted line in FIG. 16. The energy of the secondary-pressure system consumption enclosed by the heavy-dashed dotted line is greater than that in the hydraulic control circuit 70 of the first embodiment by discharge of the hydraulic oil being the leakage from the switching valve 71. In FIG. 16, the pump discharge in the first embodiment is indicated by a thin dotted line and the secondary-pressure system consumption in the first embodiment is indicated by a thin-dashed double-dotted line.

In the hydraulic control circuit 270 according to the second embodiment, total energy consumed by the oil pump 25 to discharge the hydraulic oil including losses in the various valves corresponds to a portion (pump discharge) enclosed by a thin solid line in FIG. 16. That is, energy consumed by the oil pump 25 in the hydraulic control circuit 270 is reduced relative to that in the hydraulic control circuit 70 according to the first embodiment by a change of the leakage from the switching valve 71 being the leakage of the line-pressure hydraulic oil to the leakage of the secondary-pressure hydraulic oil.

Modification of Second Embodiment

A modification of the second embodiment is described. In this modification, the two-port oil pump 25W is used instead of the oil pump 25. A MOP system using the two-port oil pump 25W has an identical configuration to that in the modification of the first embodiment. The energy consumption of the two-port oil pump 25W in the hydraulic control circuit 270 according to the modification of the second embodiment is illustrated in FIG. 17.

Figure 17:
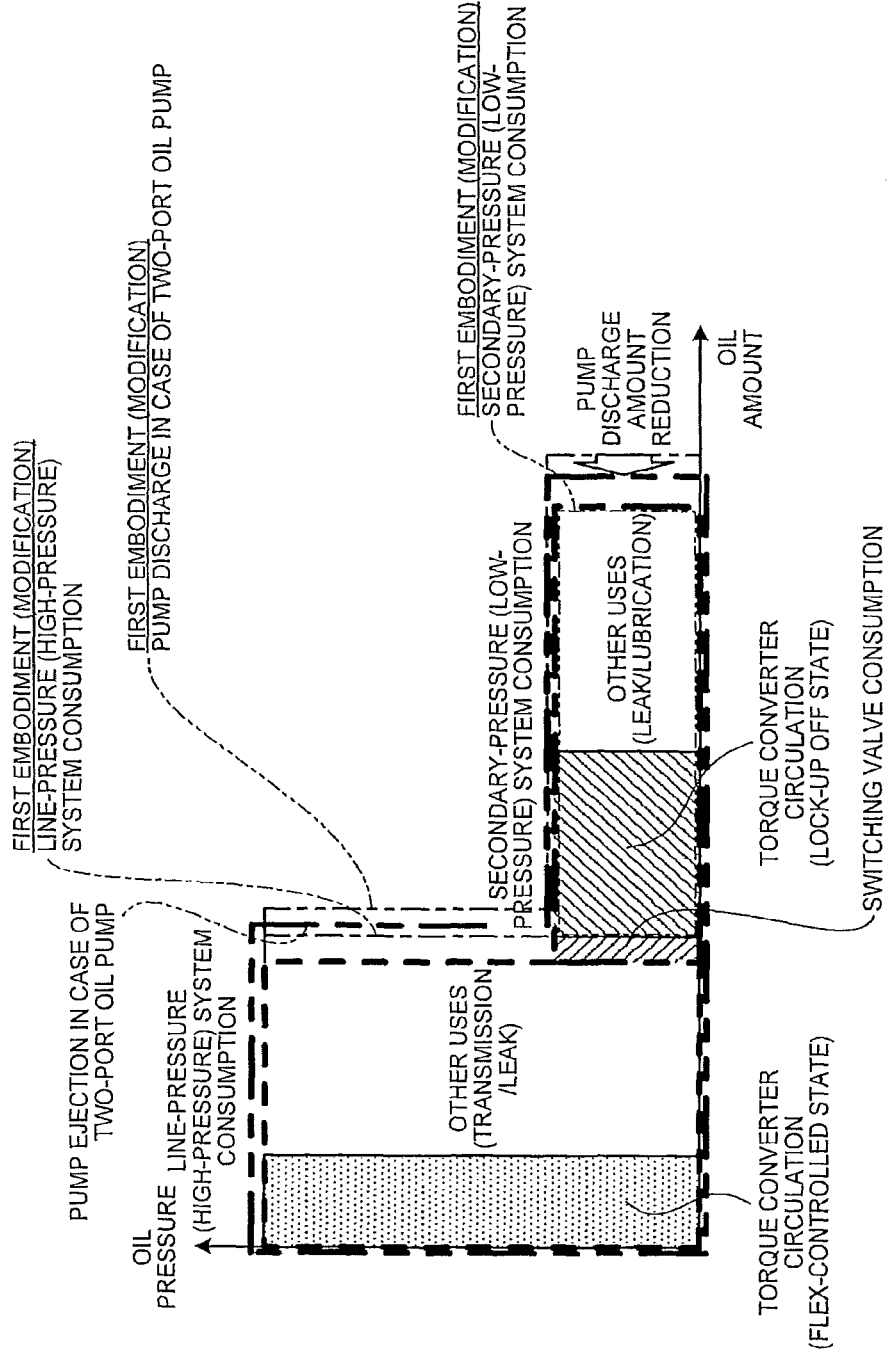
FIG. 17 is a graph illustrating details of energy consumption of a two-port oil pump in a hydraulic control circuit according to a modification of the second embodiment of the present disclosure.

As illustrated in FIG. 17, in the hydraulic control circuit 270, the energy consumption in the line-pressure system consumption and the secondary-pressure system consumption are identical to those in the second embodiment illustrated in FIG. 16 described above. When the two-port oil pump 25W is used, the energy consumed by the two-port oil pump 25W to discharge the hydraulic oil corresponds to a portion (pump discharge in a case of the two-port oil pump) enclosed by a heavy-dashed double-dotted line in FIG. 17. That is, the energy consumed by the two-port oil pump 25W is less than that in the modification of the first embodiment by a change of the leakage from the switching valve 71 being the leakage of the line-pressure hydraulic oil to the leakage of the secondary-pressure hydraulic oil. Furthermore, because the oil amount discharged from the main port 25Wm in the line-pressure system consumption is reduced relative to that in the modification of the first embodiment, the ratio (the main port ratio) of the discharge oil amount of the main port 25Wm to the discharge oil amount of the two-port oil pump 25W can be further reduced.

Also in the modification of the second embodiment, the connection of the drain 712c of the switching valve 71 to the second oil passage L2 enables the required capacity of the main port 25Wm to be reduced more also when the two-port oil pump 25W is used as the oil pump. Accordingly, the frequency of discharging the hydraulic oil at the secondary pressure less than the line pressure from the sub port 25Ws can be further increased. Therefore, the drive torque of the two-port oil pump 25W can be reduced and the transmission efficiency of the transmission 5 can be enhanced more.

While embodiments of the present disclosure have been described above in detail, the present disclosure is not limited to the above embodiments, and various modifications based on the technical concept of the present disclosure can be made. For example, the values mentioned in one of the embodiments described above are examples only, and values different from those mentioned above may also be used as necessary.

In the first embodiment described above, the switching port that can switch between passing and interruption of the hydraulic oil at the line pressure can alternatively be provided instead of the switching valve 71. According to an embodiment of the present disclosure, a leakage of the hydraulic oil from the switching valve can be supplied to the second oil passage provided outside the switching valve. Therefore, the leakage of the hydraulic oil, which is conventionally loss, can be supplied to the torque converter through the second oil passage. Accordingly, the loss in the switching valve can be reduced.

According to an embodiment of the present disclosure, in the configuration using the two-port oil pump, the hydraulic oil of the sub port of the oil pump can be set to a low pressure when the hydraulic oil does not need to be supplied to the torque converter. Therefore, an increase in the loss of the oil pump can be suppressed.

According to the hydraulic control circuit of a transmission of the present disclosure, a switching valve is provided on a downstream side of a branch position of a second oil passage from a first oil passage in a hydraulic control circuit including the two oil passages. Therefore, even when supply of hydraulic oil to a torque converter through the first oil passage is interrupted, hydraulic oil is enabled to flow into the second oil passage, so that supply of the hydraulic oil to other constituent members through the second oil passage is ensured. Furthermore, the switching valve is provided on an upstream side of an oil-pressure adjustment valve and a selection valve. Accordingly, when supply of the hydraulic oil to the torque converter becomes unnecessary and the supply of the hydraulic oil to the torque converter through the first oil passage is interrupted by the switching valve, a flow of the hydraulic oil into the oil-pressure adjustment valve and the selection valve can be also interrupted. Therefore, loss due to a leakage of the hydraulic oil from the oil-pressure adjustment valve and the selection valve can be suppressed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hydraulic control circuit of a transmission, the hydraulic control circuit comprising:
   a first oil passage and a second oil passage formed therein, the first oil passage being a passage through which hydraulic oil is supplied from an oil pump to a torque converter having a lock-up mechanism, and the second oil passage branching off from the first oil passage and having an oil pressure set to be lower than an oil pressure of hydraulic oil in the first oil passage;
   a selection valve configured to selectively switch between the hydraulic oil in the first oil passage and hydraulic oil in the second oil passage to be supplied to the torque converter;
   an oil-pressure adjustment valve provided on the first oil passage and configured to adjust an oil pressure of the hydraulic oil flowing through the first oil passage; and
   a switching valve provided on the first oil passage and configured to switch between interruption and supply of hydraulic oil to the selection valve in accordance with a lock-up on state or a flex-controlled state in the lock-up mechanism, wherein
   the switching valve is provided on a downstream side of a branch position of the second oil passage from the first oil passage in a flowing direction of the hydraulic oil in the first oil passage and on an upstream side of the oil-pressure adjustment valve.

2. The hydraulic control circuit of a transmission, according to claim 1, wherein
   the switching valve includes a body, a first valve part, and a second valve part,
   the switching valve further includes a space part having a space formed between the first valve part and the second valve part and configured to supply hydraulic oil to the oil-pressure adjustment valve when the switching valve is open, and
   the switching valve further includes a drain part having a drain configured to supply hydraulic oil to the second oil passage, the hydraulic oil being leaked from a gap between the body and the first valve part or the second valve part when the hydraulic oil passes through the space.

3. The hydraulic control circuit of a transmission, according to claim 1, wherein
   the oil pump is a two-port oil pump which includes a main port that discharges hydraulic oil having a set first oil pressure and a sub port that selectively discharges the hydraulic oil having the first oil pressure and hydraulic oil having a second oil pressure lower than the first oil pressure,
   the main port is connected to the first oil passage, and to the second oil passage via the first oil passage,
   the sub port is connected to the second oil passage and is connected to the first oil passage via a non-return valve,
   at least a part of the hydraulic oil having the first oil pressure flows in the first oil passage when the sub port discharges the hydraulic oil having the first oil pressure, and
   the sub port discharges the hydraulic oil having the second oil pressure when supply of hydraulic oil to the selection valve is interrupted by the switching valve.

4. The hydraulic control circuit of a transmission, according to claim 2, wherein
   the oil pump is a two-port oil pump which includes a main port that discharges hydraulic oil having a set first oil pressure and a sub port that selectively discharges the hydraulic oil having the first oil pressure and hydraulic oil having a second oil pressure lower than the first oil pressure,
   the main port is connected to the first oil passage, and to the second oil passage via the first oil passage,
   the sub port is connected to the second oil passage and is connected to the first oil passage via a non-return valve,
   at least a part of the hydraulic oil having the first oil pressure flows in the first oil passage when the sub port discharges the hydraulic oil having the first oil pressure, and
   the sub port discharges the hydraulic oil having the second oil pressure when supply of hydraulic oil to the selection valve is interrupted by the switching valve.

* * * * *